(12) United States Patent
Li et al.

(10) Patent No.: US 9,819,039 B2
(45) Date of Patent: *Nov. 14, 2017

(54) REDOX FLOW BATTERIES BASED ON SUPPORTING SOLUTIONS CONTAINING CHLORIDE

(71) Applicant: Battelle Memorial Institute, Richland, WA (US)

(72) Inventors: Liyu Li, Richland, WA (US); Soowhan Kim, Seoul (KR); Zhenguo Yang, Bellevue, WA (US); Wei Wang, Kennewick, WA (US); Zimin Nie, Richland, WA (US); Baowei Chen, Richland, WA (US); Jianlu Zhang, Dalian (CN); Guanguang Xia, Richland, WA (US)

(73) Assignee: Battelle Memorial Institute, Richland, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/815,037

(22) Filed: Jul. 31, 2015

(65) Prior Publication Data

US 2015/0380757 A1 Dec. 31, 2015

Related U.S. Application Data

(63) Continuation of application No. 14/105,823, filed on Dec. 13, 2013, now Pat. No. 9,123,931, which is a continuation of application No. 12/892,693, filed on Sep. 28, 2010, now Pat. No. 8,628,880.

(51) Int. Cl.
*H01M 8/08* (2016.01)
*H01M 8/18* (2006.01)
*H01M 8/20* (2006.01)

(52) U.S. Cl.
CPC .............. *H01M 8/08* (2013.01); *H01M 8/18* (2013.01); *H01M 8/188* (2013.01); *H01M 8/20* (2013.01); *H01M 2300/0002* (2013.01); *H01M 2300/0005* (2013.01); *H01M 2300/0011* (2013.01); *Y02E 60/528* (2013.01)

(58) Field of Classification Search
CPC ............ H01M 8/08; H01M 8/18; H01M 8/20; H01M 8/188; H01M 2300/0002; H01M 2300/0005; H01M 2300/0011; Y02E 60/528

See application file for complete search history.

(56) References Cited

U.S. PATENT DOCUMENTS

| 3,540,933 | A | | 11/1970 | Boeke |
| 3,996,064 | A | | 12/1976 | Thaller |
| 4,469,760 | A | | 9/1984 | Giner |
| 4,786,567 | A | | 11/1988 | Skyllas-Kazacos |
| 4,814,241 | A | * | 3/1989 | Nagashima ........... H01M 8/188 429/199 |
| 6,562,514 | B1 | * | 5/2003 | Kazacos ............... H01M 8/188 429/188 |
| 6,872,376 | B2 | | 3/2005 | Tanaka et al. |
| 7,078,123 | B2 | | 7/2006 | Kazacos et al. |
| 7,320,844 | B2 | | 1/2008 | Skyllas-Kazacos |
| 8,628,880 | B2 | | 1/2014 | Li et al. |
| 8,771,856 | B2 | | 7/2014 | Li et al. |
| 9,077,011 | B2 | | 7/2015 | Li et al. |
| 9,123,931 | B2 | | 9/2015 | Li et al. |
| 2003/0014345 | A1 | * | 1/2003 | Lim ........................ G06Q 40/02 705/36 R |
| 2003/0143456 | A1 | | 7/2003 | Kazacos et al. |
| 2005/0244707 | A1 | | 11/2005 | Skyllas-Kazacos et al. |
| 2006/0183016 | A1 | | 8/2006 | Kazacos et al. |
| 2008/0292964 | A1 | * | 11/2008 | Kazacos ............. B60L 11/1879 429/231.5 |
| 2010/0230632 | A1 | | 9/2010 | Adamson et al. |
| 2010/0291420 | A1 | | 11/2010 | Kazacos et al. |

(Continued)

FOREIGN PATENT DOCUMENTS

| CN | 1768442 | 5/2006 |
| CN | 1770503 | 5/2006 |

(Continued)

OTHER PUBLICATIONS

201180046489, Notification_to_Grant_Patent SIPO_ (Translated),Jul. 4, 2016.*
Notification of Refusal KIPO for Application No. 20157019563 Apr. 12, 2017.*
JPH0758625MT.*
JP2010-086935MT.*
JP-04019966 Proffesional translarion.*
Li, L. et al., "Development of High Performance Redox Flow Batteries at PNNL," 16 pages, DOE OE Program Review, San Diego, CA (Oct. 21, 2011).
Office Action from U.S. Patent and Trademark Office for U.S. Appl. No. 13/246,444, dated Sep. 25, 2015.
Zhang, J. et al., "Effects of additives on the stability of electrolytes for all-vanadium redox flow batteries," *J. Appl. Electrochem.*, vol. 41, Issue 10, pp. 1215-1221 (Oct. 2011).
Adam, J., "Vanadium Chloride Battery," Thesis, pp. 1-78, School of Chemical Engineering, The University of New South Wales (Oct. 2008).

(Continued)

*Primary Examiner* — Alex Usyatinsky
(74) *Attorney, Agent, or Firm* — Klarquist Sparkman, LLP

(57) ABSTRACT

Redox flow battery systems having a supporting solution that contains $Cl^-$ ions can exhibit improved performance and characteristics. Furthermore, a supporting solution having mixed $SO_4^{2-}$ and $Cl^-$ ions can provide increased energy density and improved stability and solubility of one or more of the ionic species in the catholyte and/or anolyte. According to one example, a vanadium-based redox flow battery system is characterized by an anolyte having $V^{2+}$ and $V^{3+}$ in a supporting solution and a catholyte having $V^{4+}$ and $V^{5+}$ in a supporting solution. The supporting solution can contain $Cl^-$ ions or a mixture of $SO_4^{2-}$ and $Cl^-$ ions.

14 Claims, 11 Drawing Sheets

(56) References Cited

U.S. PATENT DOCUMENTS

| | | |
|---|---|---|
| 2011/0045332 A1 | 2/2011 | Horne et al. |
| 2011/0086247 A1 | 4/2011 | Keshavarz et al. |
| 2012/0040216 A1 | 2/2012 | Parakulam |
| 2012/0077067 A1 | 3/2012 | Li et al. |
| 2012/0077079 A1 | 3/2012 | Li et al. |
| 2014/0199607 A1 | 7/2014 | Li et al. |
| 2014/0234753 A1 | 8/2014 | Li et al. |
| 2014/0248521 A1 | 9/2014 | Chiang et al. |
| 2016/0099480 A1 | 4/2016 | Nie et al. |

FOREIGN PATENT DOCUMENTS

| | | | |
|---|---|---|---|
| CN | 101213700 | | 7/2008 |
| EP | 0729648 | | 4/2003 |
| JO | JOH07758625 | * | 2/1995 |
| JP | 04019966 | | 1/1992 |
| JP | 7-058625 | | 6/1995 |
| JP | 2010-086935 | | 4/2010 |
| JP | 5590513 | | 9/2014 |
| WO | WO93/06626 | | 4/1993 |
| WO | WO95/12219 | | 5/1995 |
| WO | WO96/35239 | | 11/1996 |
| WO | WO02/095855 | | 11/2002 |
| WO | WO2004/082056 | | 9/2004 |
| WO | WO2006/135958 | | 12/2006 |
| WO | WO2008/148148 | | 12/2008 |
| WO | WO2010/094657 | | 9/2010 |
| WO | WO2016/057423 | | 4/2016 |

OTHER PUBLICATIONS

Final Office Action from U.S. Patent and Trademark Office for U.S. Appl. No. 14/105,823, dated Dec. 19, 2014.
Li, L. et al., "A stable vanadium redox-flow battery with high energy density for large-scale energy storage," *Advanced Energy Materials*, vol. 1, No. 3 pp. 394-400 (May 2011).
International Search Report for PCT/US2011/039624 (dated Mar. 23, 2012).
International Search Report/Written Opinion for PCT/US2011/039626 (dated Mar. 22, 2012).
Mohammadi, T. et al., Use of polyelectrolyte for incorporation of ion-exchange groups in composite membranes for vanadium redox flow battery applications, *Journal of Power Sources*, vol. 56, No. 1, pp. 91-96 (Jul. 1995).
Notice of Non-Final Rejection from the Korean Intellectual Property Office for Korean Patent Application No. 10-2013-7010271, dated Sep. 26, 2014.
Office Action from Chinese Patent Office for Chinese Patent Application No. 201180046489.0, dated Oct. 24, 2014.
Office Action from Japanese Patent Office for Japanese Patent Application No. 2013-830141, dated Mar. 3, 2015.
Office Action from U.S. Patent and Trademark Office for U.S. Appl. No. 13/246,444, dated Sep. 15, 2014.
Office Action from U.S. Patent and Trademark Office for U.S. Appl. No. 14/105,823, dated Apr. 25, 2014.
Office Action from U.S. Patent and Trademark Office for U.S. Appl. No. 14/261,262, dated Jul. 10, 2014.
Patent Examination Report from Australian Application No. 2011312833 (dated Oct. 2, 2013).
Patent Examination Report from the Australian Patent Office for Australian Patent Application No. 2011312833, dated Oct. 1, 2014.
Skyllas-Kazacos, M., et al., "Progress in Flow Battery Research and Development," Critical Reviews in Electrochemical and Solid-State Science and Technology, pp. R55-R79, vol. 158, *Journal of the Electrochemical Society*, Karachi, Pakistan (Jun. 2011).
Skyllas-Kazacos, Maria, "Novel Vanadium chloride/polyhalide redox flow battery," *Journal of Power Sources*, pp. 299-302, vol. 124, Elsevier, Sydney, Australia (Oct. 2003).
STN Search in U.S. Appl. No. 12/892,698 (May 24, 2013).
Sum, E. et al., "Investigation of the V(V)/V(IV) System for Use in the Positive Half-Cell of a Redox Battery," *Journal of Power Sources*, vol. 16, pp. 85-95 (Jul. 1985).
Sum, E. et al., "A study of the V(II)/V(III) Redox Couple for Redox Flow Cell Applications," *Journal of Power Sources*, vol. 15, No. 2/03, pp. 179-190 (Jun. 1985).
Supplementary European Search Report for EP11831068.9, dated May 19, 2014.
Supplementary European Search Report for EP11831069, dated May 26, 2014.
Wang, W. et al., "A new redox flow battery using Fe—V redox couples in chloride supporting electrolyte," *Energy & Environmental Science*, vol. 4, No. 10, pp. 4068-4073 (Aug. 2011).
Warshay, Brian, et al. "Grid Storage under the Microscope: Using Local Knowledge to Forecast Global Demand," Annual Report, LRSGI-R-11-1, Lux Research, Inc., pp. 1-12 (Mar. 2012).
International Search Report and Written Opinion for PCT/US2015/054075, dated Dec. 21, 2015, 8 pp.
Office Action from Japanese Patent Office for Japanese Patent Application No. 2013-830141, dated Mar. 29, 2016.
Office Action from Chinese Patent Office for Chinese Patent Application No. 201180046489.0, dated Dec. 11, 2015.
Office Action from Canadian Intellectual Property Office for Canadian Patent Application No. 2,812,928, dated Mar. 21, 2017.
Notice of Non-Final Rejection from the Korean Intellectual Property Office for Korean Patent Application No. 10-2015-7019563, dated Feb. 23, 2017.
Office Action from Canadian Intellectual Property Office for Canadian Patent Application No. 2,812,932, dated Mar. 6, 2017.

* cited by examiner

- ■ Capacity: 2.3 MV in 10 M total chloride
- ● Capacity: 1.7 MV ub 5 M total sulphate
- □ Energy Density: 2.3 MV in 10 M total chloride
- ○ Energy Density: 1.7 MV in 5 M total sulphate

REDOX FLOW BATTERIES BASED ON SUPPORTING SOLUTIONS CONTAINING CHLORIDE

CROSS REFERENCE TO RELATED APPLICATIONS

This is a Continuation of U.S. patent application Ser. No. 14/105,823, filed Dec. 13, 2013, which is a Continuation of U.S. patent application Ser. No. 12/892,693, filed Sep. 28, 2010, now U.S. Pat. No. 8,628,880, which are incorporated by reference.

STATEMENT REGARDING FEDERALLY SPONSORED RESEARCH OR DEVELOPMENT

This invention was made with Government support under Contract DE-AC0576RL01830 awarded by the U.S. Department of Energy. The Government has certain rights in the invention.

BACKGROUND

A redox flow battery (RFB) stores electrical energy in reduced and oxidized species dissolved in two separate electrolyte solutions. The anolyte and the catholyte circulate through a cell electrode separated by a porous membrane. Redox flow batteries are advantageous for energy storage because they are capable of tolerating fluctuating power supplies, repetitive charge/discharge cycles at maximum rates, overcharging, overdischarging, and because cycling can be initiated at any state of charge.

However, among the many redox couples upon which redox flow batteries are based, a number of disadvantages exist. For example, many systems utilize redox species that are unstable, are highly oxidative, are difficult to reduce or oxidize, precipitate out of solution, and/or generate volatile gases. In many ways, the existing approaches to addressing these disadvantages have been ad hoc and can include the imposition of restrictive operating conditions, the use of expensive membranes, the inclusion of catalysts on the electrodes, and/or the addition of external heat management devices. These approaches can significantly increase the complexity and the cost of the total system. Therefore, a need for improved redox flow battery systems exists.

SUMMARY

The present invention includes redox flow battery systems having a supporting solution that comprises $Cl^-$ anions. In one embodiment, a vanadium-based redox flow battery system is characterized by an anolyte comprising $V^{2+}$ and $V^{3+}$ in a supporting solution and a catholyte comprising $V^{4+}$ and $V^{5+}$ in a supporting solution. The supporting solution can comprise $Cl^-$ ions or a mixture of $SO_4^{2-}$ and $Cl^-$ ions. The use of $Cl^-$ ions can improve the energy density and the stability of an all-vanadium battery compared to the traditional use of $SO_4^{2-}$ ions.

Supporting solutions comprising both $SO_4^{2-}$ and $Cl^-$ ions can further improve the performance and characteristics by all-vanadium batteries by increasing the solubility of the vanadium cations as described in greater detail below. In particular embodiments, the concentration ratio of $Cl^-$ to $SO_4^{2-}$ can be between 1:100 and 100:1. In other embodiments, the ratio can be between 1:10 and 10:1. In still other embodiments, the ratio can be between 1:3 and 3:1.

For all-vanadium batteries, the $Cl^-$ in the supporting solution can improve stability of the vanadium cations. For example, in traditional flow redox batteries, $V^{5+}$ can tend to form $V_2O_5$ at temperatures above 40° C. However, the presence of $Cl^-$ ions in the supporting solution can result in the formation of $VO_2Cl(H_2O)_2$, a stable, neutral species. Accordingly, embodiments of the present invention can operate at cell temperatures greater than 40° C. Preferably, the cell temperature during operation is between −35° C. and 60° C. Furthermore, the embodiments of the present invention can operate without thermal management devices actively regulating the cell temperature. In conventional all-vanadium flow redox batteries, thermal management devices are required to maintain the battery below the cell temperature at which the V cations come out of solution.

Further still, vanadium cation concentrations in batteries of the present invention can exceed those of traditional $SO_4^{2-}$-based batteries. In some embodiments, the vanadium cation concentration is greater than 0.5M. In others, the vanadium cation concentration is greater than 1.7M. In still others, the vanadium cation concentration is greater than 2.5M.

In a preferred embodiment, the state of charge condition is greater than 0% and less than 100% during operation. In other words, the batteries are preferably not operated to full charge or discharge states.

In another embodiment of the present invention, a redox flow battery having a supporting solution comprising $Cl^-$ ions comprises an anolyte comprising $V^{2+}$ and $V^{3+}$ in the supporting solution, a catholyte comprising $Fe^{2+}$ and $Fe^{3+}$ in the supporting solution, and a membrane separating the anolyte and the catholyte. The anolyte and catholyte can comprise V cations and Fe cations, respectively, or the anolyte and catholyte can each contain both V and Fe cations in a mixture. In some instances, the concentrations of the Fe cations and/or the V cations can be greater than 0.5M.

Relative to some highly oxidative redox couples, The Fe and V couple is less aggressive. Accordingly, expensive oxidation-resistant membranes such as sulfonated tetrafluoroethylene based fluoropolymer-copolymers are not necessary. On a cost basis, other less expensive options can be preferable. Accordingly, some embodiments of the Fe/V battery system comprise hydrocarbon-based membranes or micro-porous separators. One example of a hydrocarbon membrane includes, but is not limited to a sulfonated poly(phenylsulfone) membrane. Other ion exchange membranes can be suitable.

In another embodiment, the Fe/V battery system comprises electrodes, which do not contain a redox catalyst, in contact with the anolyte and the catholyte. Redox catalysts are sometimes necessary for species that are difficult to reduce and/or oxidize and can include metals or metal oxides. Redox catalysts are preferably absent from the electrodes used in embodiments of the present invention.

Some embodiments of the Fe/V battery system operate at cell temperatures below 60° C. In other embodiments, the system operates at cell temperatures between −20° C. and 50° C. In preferred embodiments, the system does not include a heat management device actively regulating the cell temperature. In particular, no heat management device is utilized to heat the Fe/V battery system.

In the Fe/V battery systems, supporting solutions comprising both $SO_4^{2-}$ and $Cl^-$ ions can further improve the performance and characteristics by increasing the solubility of the cations as described in greater detail below. In particular embodiments, the concentration ratio of $Cl^-$ to $SO_4^{2-}$ can be between 1:100 and 100:1. In other embodiments, the ratio can be between 1:10 and 10:1. In still other embodiments, the ratio can be between 1:3 and 3:1. Instances in which the supporting solution comprises both $Cl^-$ to $SO_4^{2-}$ and the anolyte and catholyte both comprise V and Fe cations, the concentration of $V^{2+}$, $V^{3+}$, $Fe^{2+}$, and $Fe^{3+}$ are greater than 1.5M. Instances in which the anolyte comprises V cations and the catholyte comprises Fe cations, the concentrations of $V^{2+}$ and $V^{3+}$ are greater than 2M in the anolyte and concentrations of $Fe^{2+}$ and $Fe^{3+}$ are greater than 2M in the catholyte.

In yet another embodiment, a redox flow battery system comprises a supporting solution that comprises a mixture of $SO_4^{2-}$ and $Cl^-$. As described elsewhere herein, a supporting solution having mixed $SO_4^{2-}$ and $Cl^-$ can provide increased energy density and improved stability and solubility of one or more of the ionic species in the catholyte and/or anolyte, such as $Fe^{2+}$, $Fe^{3+}$, $Cr^{2+}$, $Cr^{3+}$, and others. In particular embodiments, the concentration ratio of $Cl^-$ to $SO_4^{2-}$ can be between 1:100 and 100:1. In other embodiments, the ratio can be between 1:10 and 10:1. In still other embodiments, the ratio can be between 1:3 and 3:1. In still other embodiments, other halogen ions can be mixed with $SO_4^{2-}$, including but not limited to, $F^-$.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

The following description includes the preferred best mode as well as other embodiments of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

Figure 1:
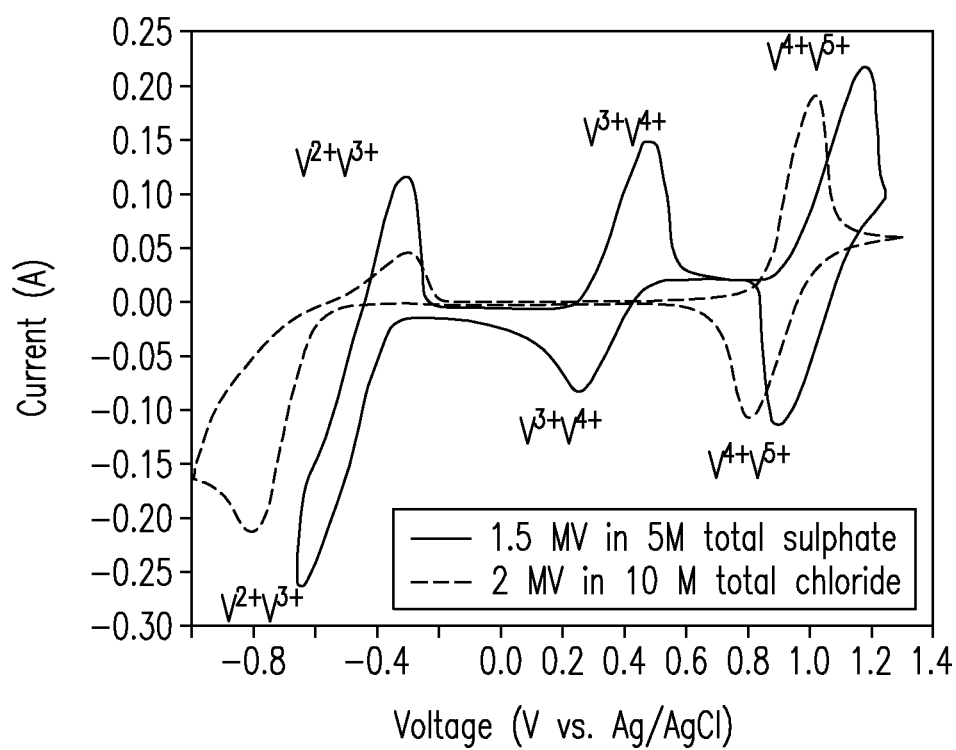
FIG. 1 is a graph of current versus voltage comparing all-vanadium RFBs using chloride-containing and sulfate-containing supporting solutions.

FIGS. 1-10 show a variety of embodiments and aspects of the present invention. Referring first to FIG. 1, current versus voltage data is plotted for vanadium ion redox couples using either chloride or sulfate supporting solutions. Three redox couples were observed in the chloride system, indicating that two redox couples ($VO^{2+}/VO_2^+$ for the positive and $V^{2+}/V^{3+}$ for the negative) can be employed for a redox flow battery. Electrochemical reversibility of the $V^{4+}/V^{5+}$ couple was similar to that of a sulfate system, but that of the $V^{2+}/V^{3+}$ was significantly improved in the chloride system. For example, the peak potential difference is 0.351 V in the sulfate system and 0.509 V in the chloride system.

According to quantum chemistry calculations, the $V^{5+}$ species in the chloride solution forms $VO_2Cl(H_2O)_2$, which is a more stable neutral species than $[VO_2(H_2O)_3]^+$, the species commonly formed in the sulfate solution. However, $V^{2+}$, $V^{3+}$ and $V^{4+}$ in the chloride solution have a similar structure to that in the sulfate solution. Based on the above, the half cell reaction shown in Eq. (2) for the positive pole describes well the electrochemistry. The standard potential of this half cell reaction is expected to be slightly higher than that of the conventional sulfate system resulting from a different $V^{5+}$ species. By forming this new structure, the thermal stability of the $V^{5+}$ in the chloride solution was significantly improved.

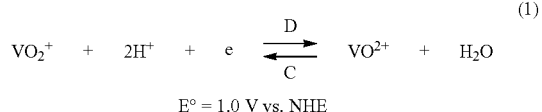

(1)

$$VO_2^+ + 2H^+ + e \underset{C}{\overset{D}{\rightleftarrows}} VO^{2+} + H_2O$$

$E° = 1.0$ V vs. NHE

-continued

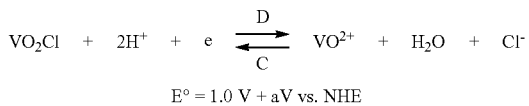  (2)

$E° = 1.0 V + aV$ vs. NHE

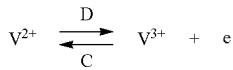  (3)

$E° = -0.25$ V vs. NHE

Figure 2A:
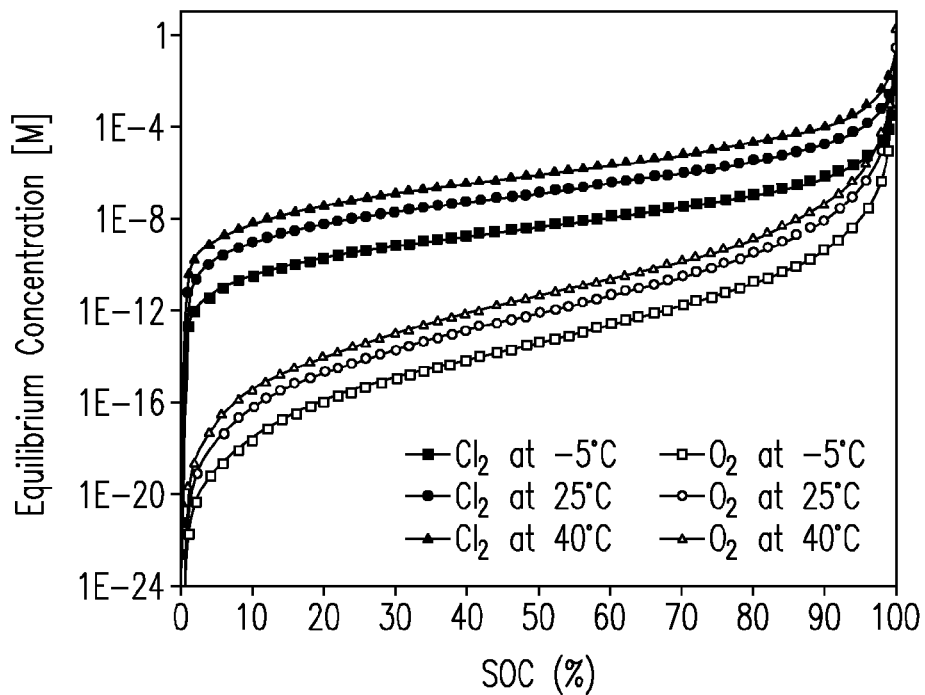
FIGS. 2A and 2B compare thermodynamic equilibrium concentrations (a) and equilibrium potentials (b) of chlorine and oxygen gases in vanadium chloride RFB systems.

In the chloride system, oxygen and chlorine gas evolution during charging can reduce columbic efficiency. Referring to FIG. 2A, equilibrium concentrations of chlorine or oxygen estimated from thermodynamic equilibrium for Eq. (1) and (4), and Eq. (1) and (5), respectively, are shown as a function at the state of charge (SOC) at various temperatures. It should be noted that hypochlorite can be negligible because the equilibrium constant of Eq. (6) is 6.35E-13 at 25° C. The actual concentrations of the chlorine should be lower than the values depicted in FIG. 2A due to complex formation. Within a typical operation window of redox flow batteries (i.e., SOC of 20~80%), the chlorine concentration is negligible even at 40° C. However, gas evolution may be significant at SOC values approaching 100%.

Figure 2B:
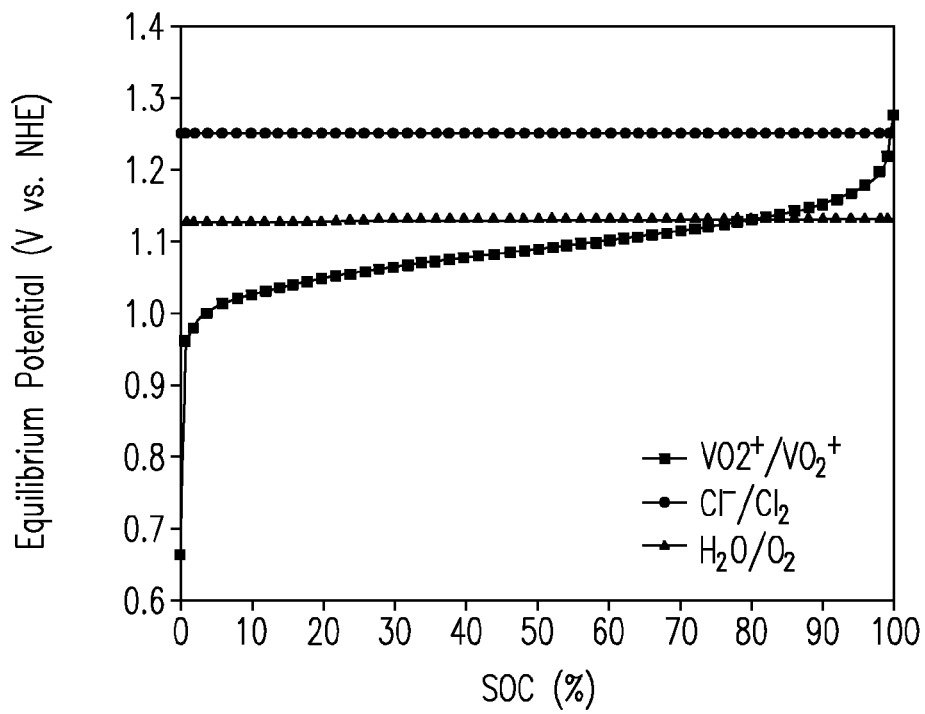

Chlorine has much higher solubility in water than oxygen; Henry's constant of chlorine and oxygen in water at 25° C. is 0.062 mol/L-atm and 0.0013 mol/L-atm, respectively. Assuming partial pressure of oxygen and chlorine is 0.1 bar, the equilibrium potential of Eq. (4) and (5) was calculated for 2.3 M V in 10 M total chloride system, and is shown in FIG. 2B as a function of SOC. Based on the data, $VO_2^+$ is thermodynamically stable from oxygen evolution below an 80% SOC, and from chlorine evolution below a 98% SOC. To maintain saturation of chlorine in the electrolyte solution, the flow battery is preferably operated in a closed system. A closed system is also advantageous to prevent rapid oxidation of $V^{2+}$ and $V^{3+}$ by air and to minimize electrolyte loss.

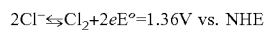  (4)

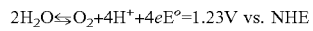  (5)

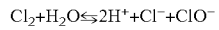  (6)

In addition to thermodynamic equilibrium, electrode overpotential can contribute to gas evolution. The equilibrium potential of reaction (4) is higher than that of reaction (5), but oxygen evolution can be negligible compared to chlorine evolution because of a higher overpotential on the electrode. For example, the chlorine evolution overpotential on a graphite porous electrode was 0.12 V at 25° C. at charge current of 22 mA/cm² for a $Zn/Cl_2$ battery (see N. Watanabe, T. Touhara, New Mat. New Processes, 1 (1981) 62). This overpotential was higher than that of the oxidation reaction in Eq. (2) above. Therefore, the chlorine evolution reaction can be negligible except for an SOC of ~100%. Because the electrode overpotential of chlorine evolution decreases with increasing temperature, charging is preferably controlled below SOC of 90~95% to prevent chlorine evolution, especially at elevated temperature.

The thermal stabilities of different vanadium ion species in either sulfate or chloride supporting solutions are summarized in Table 1. In the sulfate system, with more than 1.7 M vanadium, $V^{2+}$ and $V^{4+}$ experienced precipitation at low temperatures (−5° C. and 25° C.), and $V^{5+}$ suffered from precipitation at 40° C. In the chloride system, thermal stability was significantly improved. $V^{2+}$, $V^{4+}$ and $V^{5+}$ were stable for more than 10 days in the temperature ranges of −5 and 50° C. for 2.3 M vanadium. According to nuclear magnetic resonance data (not shown), $V^{5+}$ in the sulfate solution exists as a form of $[VO_2(H_2O)_3]+$. With increasing temperature, this complex decomposed into $VO(OH)_3$ and $H_3O^+$, and then $VO(OH)_3$ is converted into a precipitate of $V_2O_5 \cdot 3H_2O$. As mentioned elsewhere herein, $V^{5+}$ is believed to exist as a stable neutral form of $VO_2Cl(H_2O)_2$ in the chloride solution. Regardless, the supporting solutions comprising Cl⁻ can enable better stability at higher temperature.

TABLE 1

Comparison of thermal stability of $V^{n+}$ for chloride and sulfate systems.

| $V^{n+}$ species | $V^{n+}$ [M] | $H^+$ [M] | $SO_4^{2-}$ [M] | $Cl^-$ [M] | T (° C.) | Time for precipitation |
|---|---|---|---|---|---|---|
| $V^{2+}$ | 2 | 6 | 5 | 0 | −5 | 419 hr |
|  | 2 | 6 | 5 | 0 | 25 | Stable (>20 d) |
|  | 2 | 6 | 5 | 0 | 40 | Stable (>20 d) |
| $V^{3+}$ | 2 | 4 | 5 | 0 | −5 | Stable (>20 d) |
|  | 2 | 4 | 5 | 0 | 25 | Stable (>20 d) |
|  | 2 | 4 | 5 | 0 | 40 | Stable (>20 d) |
| $V^{4+}$ ($VO^{2+}$) | 2 | 6 | 5 | 0 | −5 | 18 hr |
|  | 2 | 6 | 5 | 0 | 25 | 95 hr |
|  | 2 | 6 | 5 | 0 | 40 | Stable (>20 d) |
| $V^{5+}$ ($VO_2^+$) | 2 | 8 | 5 | 0 | −5 | Stable (>20 d) |
|  | 2 | 8 | 5 | 0 | 25 | Stable (>20 d) |
|  | 2 | 8 | 5 | 0 | 40 | 95 hr |
|  | 1.8 | 8.4 | 5 | 0 | 40 | 358 hr |
| $V^{2+}$ | 2.3 | 5.4 | 0 | 10 | −5 | Stable (>20 d) |
|  | 2.3 | 5.4 | 0 | 10 | 25 | Stable (>20 d) |
|  | 2.3 | 5.4 | 0 | 10 | 40 | Stable (>20 d) |
| $V^{3+}$ | 1.5 | 3.0 | 0 | 7.5 | −5 | Stable (>20 d) |
|  | 1.8 | 3.0 | 0 | 8.4 | −5 | 124 hr |
|  | 2.3 | 3.1 | 0 | 10 | −5 | 96 hr |
|  | 2.3 | 3.1 | 0 | 10 | 25 | Stable (>20 d) |
|  | 2.3 | 3.1 | 0 | 10 | 40 | Stable (>20 d) |
| $V^{4+}$ ($VO^{2+}$) | 2.3 | 5.4 | 0 | 10 | −5 | Stable (>20 d) |
|  | 2.3 | 5.4 | 0 | 10 | 25 | Stable (>20 d) |
|  | 2.3 | 5.4 | 0 | 10 | 40 | Stable (>20 d) |
| $V^{5+}$ ($VO_2^+$) | 2.3 | 7.7 | 0 | 10 | −5 | Stable (>20 d) |
|  | 2.3 | 7.7 | 0 | 10 | 25 | Stable (>20 d) |
|  | 2.3 | 7.7 | 0 | 10 | 40 | Stable (>20 d) |
|  | 2.3 | 7.7 | 0 | 10 | 50 | Stable (>10 d) |

When operation of an all Cl⁻ system occurs at, or below, freezing temperatures (i.e., 0° C.), the tank containing the electrolyte is preferably insulated to maintain waste heat from the flow battery, which can be approximately 20% of total energy. Operation above the freezing temperature, energy density can be improved by approximately 35% owing to higher vanadium concentration compared to the sulfate system. Stabilization of the $V^{3+}$ species at the lower temperature can be achieved by using a supporting solution containing both $SO_4^{2-}$ and Cl⁻, as is described in greater detail elsewhere herein.

Typical energy efficiency of vanadium redox flow batteries is about 80%; indicating 20% of the energy is released as waste heat during each cycle. Assuming an adiabatic system, the electrolyte temperature can increase by about 4° C. per cycle. The thermal stability of electrolytes at higher temperatures can be a major concern, especially on hot days. For conventional all vanadium sulfate systems, active thermal management devices such as heat exchangers are commonly employed to maintain the cell temperature below 40° C. and to prevent precipitation of $V^{5+}$. An active thermal management system is not preferable and is a significant parasitic energy loss. Embodiments of the present invention based on vanadium and Cl-containing supporting solution can be operated at a wide range of temperatures between 0 to 50° C. without an active thermal management system, improving significant system efficiency and also reducing cost.

Flow cell performance for different chloride and sulfate systems were evaluated under the identical test conditions. The results at different discharging current densities were summarized in Table 2. Energy density of the chloride system was ~38 Wh/L, 30% higher than that of the sulfate system, resulting from the higher solubility of vanadium in the chloride solution. This higher energy density can reduce the system cost by reducing tank size and footprint. Columbic efficiency of the chloride system was 94~97% under operation of SOC between 0 and 100% (not inclusive), comparable to that of the sulfate system, which was 95~97%.

TABLE 2

Comparison of discharging rate capability for VSRFB (1.7M V in 5M total sulphate) and VCRFB (2.3M V in 10M total chloride).

| CD (mA/cm$^2$) | Capacity (Ah) | | Energy density* (Wh/L) | | Efficiency | | | | | |
|---|---|---|---|---|---|---|---|---|---|---|
| | | | | | Coulomb | | Energy | | Voltage | |
| | Cl$^-$ | SO$_4^{2-}$ | Cl$^-$ | SO$_4^{2-}$ | Cl$^-$ | SO$_4^{2-}$ | Cl$^-$ | SO$_4^{2-}$ | Cl$^-$ | SO$_4^{2-}$ |
| 100 | 2.75 | 2.14 | 35.5 | 27.9 | 0.94 | 0.95 | 0.80 | 0.83 | 0.85 | 0.87 |
| 75 | 2.75 | 2.14 | 36.6 | 28.4 | 0.96 | 0.96 | 0.84 | 0.85 | 0.87 | 0.89 |
| 50 | 2.75 | 2.14 | 37.8 | 29.1 | 0.97 | 0.96 | 0.87 | 0.88 | 0.90 | 0.91 |
| 25 | 2.74 | 2.13 | 38.7 | 29.7 | 0.97 | 0.97 | 0.90 | 0.91 | 0.92 | 0.94 |

*Note that energy density was calculated only by electrolyte volume.

Figure 3A:
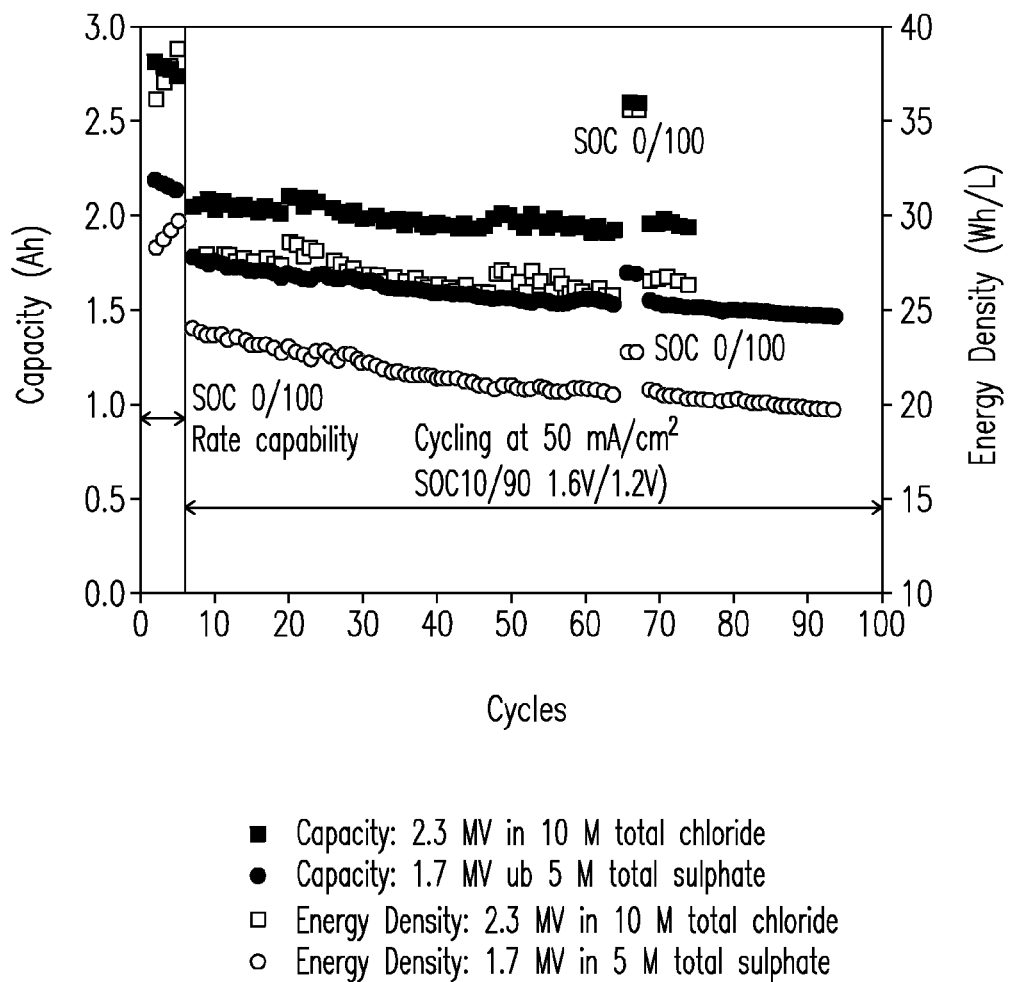
FIGS. 3A and 3B compare cyclic performances of vanadium chloride RFB systems and vanadium sulfate RFB systems.
Figure 3B:
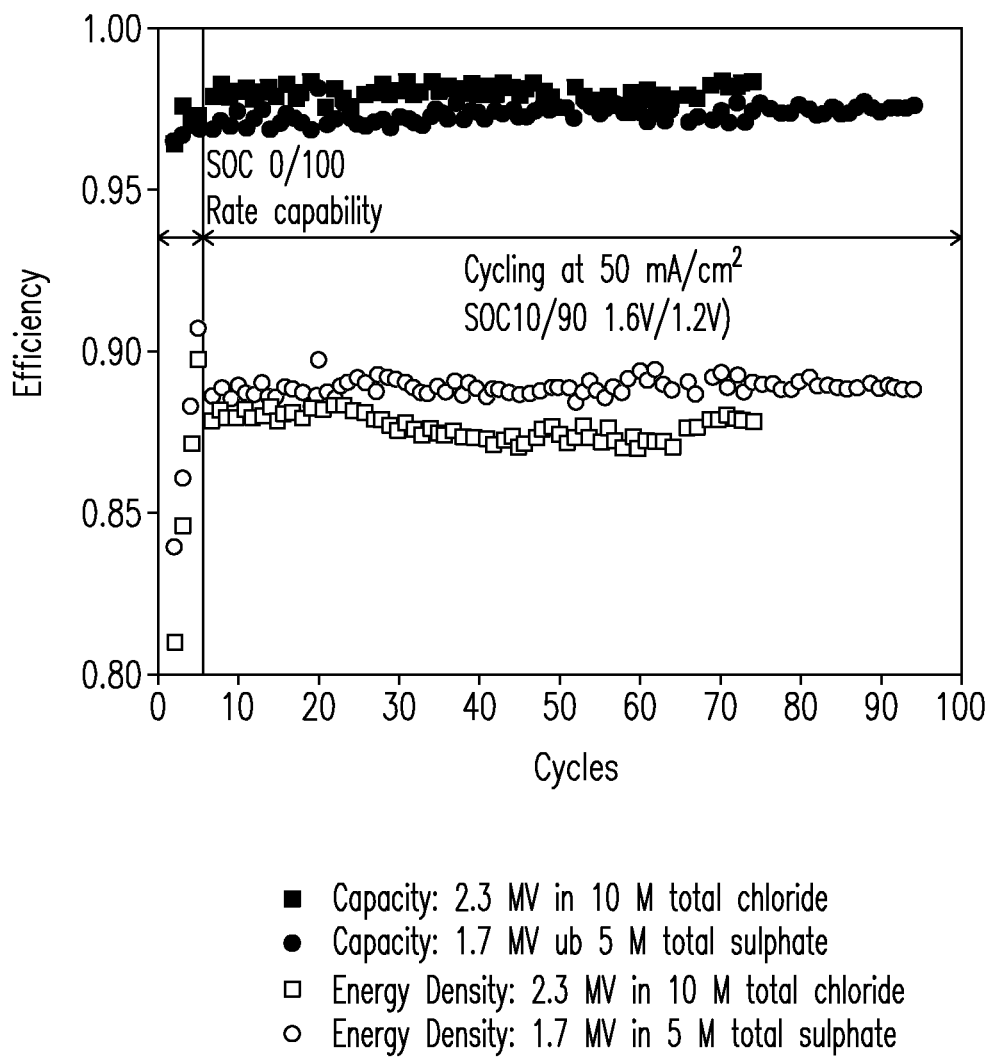

Cyclic performance of both systems at ambient temperature was also evaluated by cycling between 1.6V and 1.2V, which are shown in FIGS. 3A and 3B. The capacities of both systems slightly decreased with cycles because of different transport rate of vanadium species across the membrane. This capacity loss can be recovered by remixing and rebalancing anolyte and catholyte because a single element of V is used for both solutions. Energy and coulombic efficiencies for the chloride system was stable with cycles and comparable to those of sulfate system. It can be concluded that the novel all vanadium chloride flow battery can be stably operated in a comparable energy efficiency to the sulfate system, while delivering energy density of ~38 Wh/L, 30% higher than the sulfate system. Chlorine evolution or V$^{5+}$ electrolyte stability in the chloride solution was not an issue under closed operation conditions.

Electrolyte for the all vanadium chloride systems described above was prepared by dissolving V$_2$O$_3$ in concentrated HCl (38%). The electrolyte for the all vanadium sulphate system was fabricated by dissolving VOSO$_4$·3.8H$_2$O in sulfuric acid (95.8%).

Cyclic voltammetry (CV) tests for the chloride system were conducted with identical graphite felts (φ=5 mm mm) used in flow cell testing to identify redox couples and electrochemical reversibility using Solartron 1287 potentiostat. The scan rate was 0.5 mV/s.

Cell performance of two different systems was measured using a flow cell system under identical test conditions. The apparent area of the graphite felt was 10 cm$^2$ (2 cm×5 cm), in contact with NAFION 117 membrane, a sulfonated tetrafluoroethylene based fluoropolymer-copolymer. Other proton-exchange membranes can be suitable. 2.3 M vanadium in 10 M total chloride solution and 1.7 M V in 5 M total sulphate solution were used for performance comparison. Each electrolyte volume and flow rate was 50 mL and 20 mL/min, respectively. The effect of different discharging current densities was evaluated in the first 5 cycles with the same charging current of 50 mA/cm$^2$. The flow cell was charged to 1.7 V and then discharged to 0.8 V. After that, the flow cell was cycled between 1.6 V and 1.2 V at 50 mA/cm$^2$.

The electrolyte stability tests were carried out in polypropylene tubes at −5, 25, 40, and 50° C., using about 5 ml solution for each sample. During the stability tests, the samples were kept static without any agitation, and were monitored daily by naked eye for the formation of precipitation.

Referring to Table 3, which summarizes the stability of V$^{2+}$, V$^{3+}$, V$^{4+}$, and V$^{5+}$ in sulfuric acid solutions, conventional sulfuric acid-only vanadium redox flow batteries (VRFB) can typically only be operated at cell temperatures between 10° C. and 40° C. with vanadium concentration in the electrolytes less than 1.7 M (with an energy density <25 Wh/L). The electrochemical reactions of an all vanadium sulfate redox flow battery are represented by the following equations.

(7)

Catholyte:

$E° = 1.00$ V (8)

Membrane:

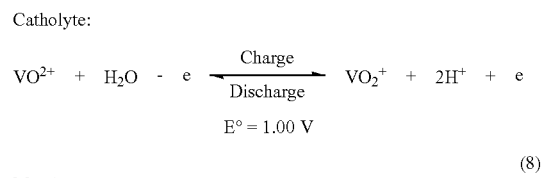

(9)

Anolyte:

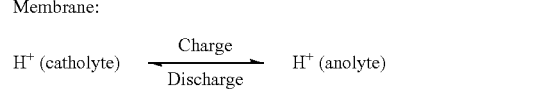

$E° = -0.25$ V (10)

Overall:

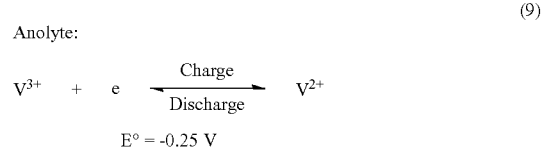

$E° = 1.25$ V $$2VOSO_4 + 2H_2O + V_2(SO_4)_3 \underset{\text{Discharge}}{\overset{\text{Charge}}{\rightleftharpoons}} (VO_2)_2SO_4 + 2H_2SO_4 + 2VSO_4 \quad (11)$$

TABLE 3

Stability of $V^{n+}$ cations in $H_2SO_4$ solution

| $V^{n+}$ specie | $V^{n+}$, M | $H^+$, M | $SO_4^{2-}$, M | T, ° C. | Time for precipitation |
|---|---|---|---|---|---|
| $V^{2+}$ | 2 | 6 | 5 | −5 | Stable (>10 d) |
|  | 2 | 6 | 5 | 25 | Stable (>10 d) |
|  | 2 | 6 | 5 | 40 | Stable (>10 d) |
| $V^{3+}$ | 2 | 4 | 5 | −5 | Stable (>10 d) |
|  | 2 | 4 | 5 | 25 | Stable (>10 d) |
|  | 2 | 4 | 5 | 40 | Stable (>10 d) |
| $V^{4+}$ ($VO^{2+}$) | 2 | 6 | 5 | −5 | 18 hr |
|  | 2 | 6 | 5 | 25 | 95 hr |
|  | 2 | 6 | 5 | 40 | Stable (>10 d) |
| $V^{5+}$ ($VO^{2+}$) | 2 | 8 | 5 | −5 | Stable (>10 d) |
|  | 2 | 8 | 5 | 25 | Stable (>10 d) |
|  | 2 | 8 | 5 | 40 | 95 hr |

As mentioned earlier, since the standard potential of reaction $2Cl^- - 2e = Cl_2$ (g) ($E° = 1.36$ V) is much higher than that of Reaction (7), the supporting solution in a VRFB system can comprise $Cl^-$ either as a $SO_4^{2-}$ and $Cl^-$ mixture or comprising $Cl^-$ as the only anion. Moreover, as is described elsewhere herein, the use of mixed $SO_4^{2-}$ and $Cl^-$ in the supporting solution is not limited to vanadium-based redox flow batteries. Chloride and sulfate ions in the supporting solution can help stabilize relatively higher concentrations of other cations as well.

Figure 4:
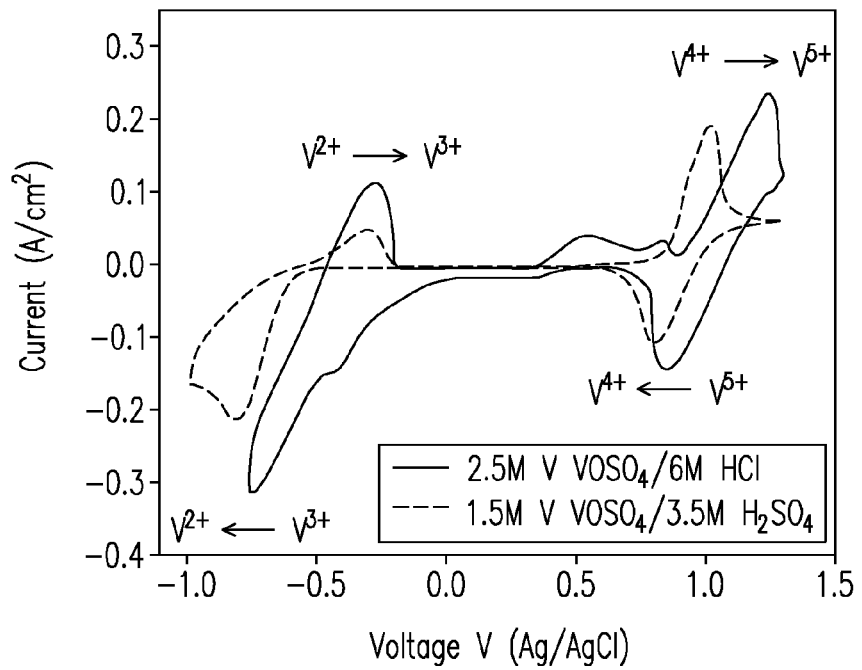
FIG. 4 compares cyclic voltammetry curves of a vanadium-chloride-sulfate solution and a vanadium sulfate solution.
Figure 5:
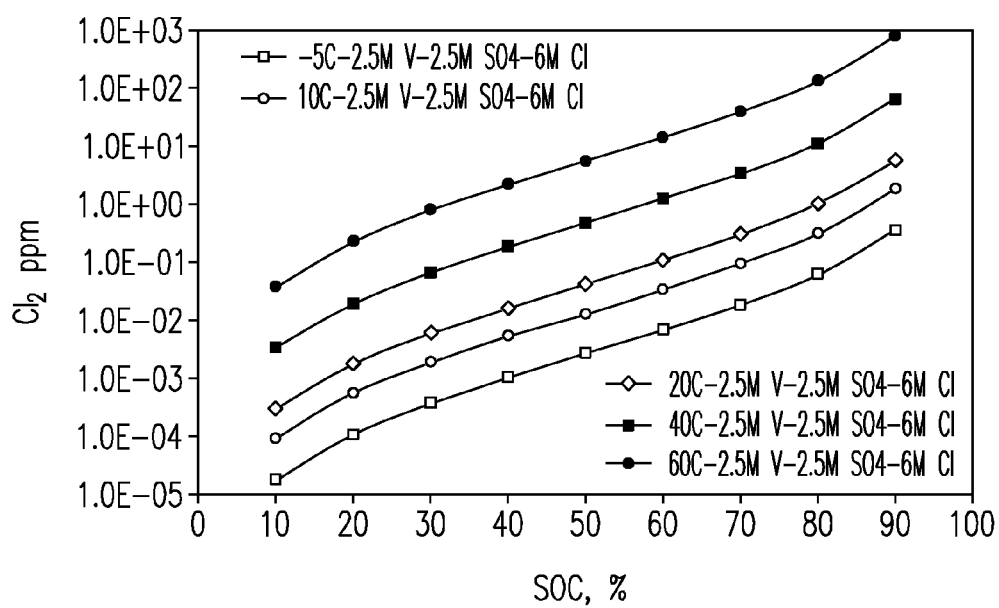
FIG. 5 is a graph of equilibrium concentrations of chlorine in the positive side of a vanadium-chloride-sulfate cell at various states of charge.

FIG. 4 shows the cyclic voltammetry curve of a solution containing 2.5 M $VOSO_4$ and 6 M HCl. This curve is similar to that of a solution containing 1.5 M $VOSO_4$ and 3.5 M $H_2SO_4$. Referring to FIG. 5, the equilibrium concentrations of $Cl_2$ gas in a vanadium sulfate-chloride catholyte solution (containing 2.5 M vanadium, 2.5 M sulfate, and 6 M chloride) under different state-of-charge (SOC) conditions were calculated according to Reaction 12. Under normal flow battery operation conditions (i.e., T<40° C. and SOC<80%), the equilibrium concentration of $Cl_2$ gas is less than 10 ppm. Due to its high solubility in water (0.57 g $Cl_2$ per 100 g water at 30° C.), most of the $Cl_2$ gas generated should be dissolved in the catholyte solutions. At high temperatures, SOC values higher than 80% are preferably avoided to minimize the $Cl_2$ gas evolution. Nevertheless, a closed system can be used to minimize continuous $Cl_2$ gas generation and to prevent $Cl_2$ gas emission to the environment. Such closed systems are commonly required for the conventional vanadium sulfate flow battery system to prevent oxidation of $V^{2+}$ and $V^{3+}$ by $O_2$ in air, and to prevent water loss from electrolyte solutions.

$$2VO_2^+(a) + 4H^+(a) + 2Cl^-(a) = 2VO^{2+}(a) + Cl_2(g) + 2H_2O \quad (12)$$

The stability of different $V^{n+}$ cations in Cl-containing solutions was evaluated at a temperature range of −5° C. to 40° C. The results are given in Table 4. More than 2.3 M $VOCl_2$ and $VO_2Cl$ were stabilized in ~6 M HCl solution over a temperature range of ~5° C. to 40° C., which is much higher than those in the sulfuric acid solution (~1.5 M vanadium) over the same temperature range. The Cl⁻ anions appears to stabilize $VO_2^+$ and $VO^{2+}$ cations in the solution. Similar to that in the $H_2SO_4$ solution, more than 2.3 M $V^{2+}$ was also stabilized in ~6 M HCl solution at −5° C. to 40° C. However, compared to that in the $H_2SO_4$ solution, the stability of $V^{3+}$ in HCl solution was decreased. At −5° C., only about 1.5 M $V^{3+}$ could be stabilized in 3 M HCl, whereas more than 2 M $V^{3+}$ was stabilized in 2 M $H_2SO_4$ (see Table 4).

TABLE 4

Stability of $V^{n+}$ cations in HCl solution

| $V^{n+}$ specie | $V^{n+}$, M | $H^+$, M | $Cl^-$, M | T, ° C. | Time for precipitation |
|---|---|---|---|---|---|
| $V^{2+}$ | 2.3 | 5.4 | 10 | −5 | Stable (>10 d) |
|  | 2.3 | 5.4 | 10 | 25 | Stable (>10 d) |
|  | 2.3 | 5.4 | 10 | 40 | Stable (>10 d) |
| $V^{3+}$ | 1.5 | 3.0 | 7.5 | −5 | Stable (>10 d) |
|  | 1.8 | 3.0 | 8.4 | −5 | 124 hr |
|  | 2.3 | 3.1 | 10 | −5 | 96 hr |
|  | 2.3 | 3.1 | 10 | 25 | Stable (>10 d) |
|  | 2.3 | 3.1 | 10 | 40 | Stable (>10 d) |
| $V^{4+}$ ($VO^{2+}$) | 2.3 | 5.4 | 10 | −5 | Stable (>10 d) |
|  | 2.3 | 5.4 | 10 | 25 | Stable (>10 d) |
|  | 2.3 | 5.4 | 10 | 40 | Stable (>10 d) |
| $V^{5+}$ ($VO_2^+$) | 2.3 | 7.7 | 10 | −5 | Stable (>10 d) |
|  | 2.3 | 7.7 | 10 | 25 | Stable (>10 d) |
|  | 2.3 | 7.7 | 10 | 40 | Stable (>10 d) |

Based on the stability test results above, $Cl^-$ anions can help stabilizing $VO^{2+}$ and $VO_2^+$ cations, and $SO_4^{2-}$ anions can help stabilize $V^{3+}$ cations. Both $Cl^-$ and $SO_4^{2-}$ anions can stabilize $V^{2+}$ cations. Accordingly, a sulfuric acid and hydrochloric acid mixture can stabilize high concentrations of all four vanadium cations. Table 5 gives the stability of different $V^{n+}$ cations in two mixed $SO_4^{2-}$ and $Cl^-$ solutions at −5° C. to 40° C. Without optimization, about 2.5 M of all four $V^{n+}$ cations were effectively stabilized in the 2.5 M $SO_4^{2-}$-6 M $Cl^-$ mixed acid solution. At a higher vanadium concentration (3M), $V^{2+}$, $VO^{2+}$, and $VO_2^+$ were also stabilized in the 3 M $SO_4^{2-}$-6 M $Cl^-$ mixed acid solution at −5° C. to 40° C. However, $V^{3+}$ was only stable for about 8 days at −5° C. Precipitation of VOCl was observed. Due to the large amount of heat generation during the operation of a VRFB system, it is not difficult to keep the cell temperature of the electrolytes higher than −5° C. even when the ambient temperature is −5° C. or lower. Also, since a VRFB system is always operated under 80 to 90% state-of-charge and state-of-discharge conditions, the highest concentration of $V^{3+}$ in a 3 M all vanadium flow battery system is 2.7 M (mixing with 0.3 M $V^{2+}$, at the end of 90% discharge) or 2.4 M (mixing with 0.6 M $V^{2+}$, at the end of 80% discharge). Therefore, in one embodiment, by using a sulfuric acid and hydrochloric acid mixture as the supporting solution, the VRFB system uses a supporting solution with a total vanadium concentration higher than 3 M.

TABLE 5

Stability of $V^{n+}$ in the $SO_4^{2-}$ + $Cl^-$ solutions

| $V^{n+}$ specie | $V^{n+}$ [M] | $H^+$ [M] | $SO_4^{2-}$ [M] | $Cl^-$ [M] | T (° C.) | Time for precipitation |
|---|---|---|---|---|---|---|
| $V^{2+}$ | 3 | 6 | 3 | 6 | −5 | Stable (>10 d) |
|  | 2.5 | 6 | 2.5 | 6 | −5 | Stable (>10 d) |
|  | 2.5 | 6 | 2.5 | 6 | 25 | Stable (>10 d) |
|  | 2.5 | 6 | 2.5 | 6 | 40 | Stable (>10 d) |
|  | 3 | 6 | 3 | 6 | 40 | Stable (>10 d) |
| $V^{3+}$ | 3 | 3 | 3 | 6 | −5 | 192 hr (8 d) |
|  | 2.5 | 3.5 | 2.5 | 6 | −5 | Stable (>10 d) |
|  | 2.5 | 3.5 | 2.5 | 6 | 25 | Stable (>10 d) |

TABLE 5-continued

Stability of $V^{n+}$ in the $SO_4^{2-}$ + $Cl^-$ solutions

| $V^{n+}$ specie | $V^{n+}$ [M] | $H^+$ [M] | $SO_4^{2-}$ [M] | $Cl^-$ [M] | T (°C.) | Time for precipitation |
|---|---|---|---|---|---|---|
| | 2.5 | 3.5 | 2.5 | 6 | 40 | Stable (>10 d) |
| | 3 | 3 | 3 | 6 | 40 | Stable (>10 d) |
| $V^{4+}$ ($VO^{2+}$) | 3 | 6 | 3 | 6 | −5 | Stable (>10 d) |
| | 2.5 | 6 | 2.5 | 6 | −5 | Stable (>10 d) |
| | 2.5 | 6 | 2.5 | 6 | 25 | Stable (>10 d) |
| | 2.5 | 6 | 2.5 | 6 | 40 | Stable (>10 d) |
| | 3 | 6 | 3 | 6 | 40 | Stable (>10 d) |
| $V^{5+}$ ($VO_2^+$) | 3 | 9 | 3 | 6 | −5 | Stable (>10 d) |
| | 2.5 | 8.5 | 2.5 | 6 | −5 | Stable (>10 d) |
| | 2.5 | 8.5 | 2.5 | 6 | 25 | Stable (>10 d) |
| | 2.5 | 8.5 | 2.5 | 6 | 40 | Stable (>10 d) |
| | 3 | 9 | 3 | 6 | 40 | Stable (>10 d) |
| | 2.7 $V^{5+}$ + 0.3 $V^{4+}$ | 7.7 | 3 | 6 | 50 | Stable (>10 d) |
| | 2.7 $V^{5+}$ + 0.3 $V^{4+}$ | 7.7 | 3 | 6 | 60 | Stable (>10 d) |

Figure 6A:
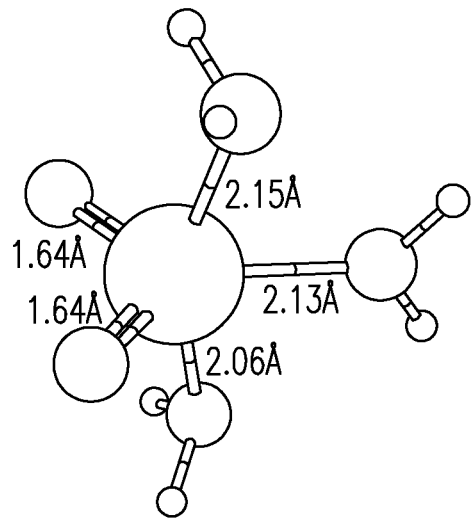
FIGS. 6A and 6B are diagrams depicting structures of $VO_2^-$ in sulfuric acid (a) and in hydrochloric acid (b).
Figure 6B:
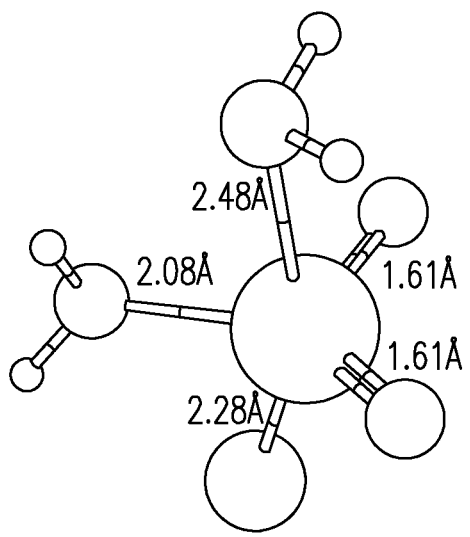

At temperatures higher than 40° C., in traditional all-vanadium sulfate RFBs the stability of $V^{5+}$ might decrease due to the formation of $V_2O_5$. However, as shown in Table 5, embodiments of the present invention using mixed $SO_4^{2-}$-$Cl^-$ solutions exhibit excellent stability with a mixture of 2.7 M $V^{5+}$ and 0.3 M $V^{4+}$ (corresponding to 90% of state-of-charge of a 3 M VRFB system) at temperatures as high as 60° C., indicating that $Cl^-$ anions can effectively stabilize the $VO_2^+$ cations. As described elsewhere herein, quantum chemistry calculations show that, in Cl-containing solutions, a stable neutral species can form having the formula $VO_2Cl(H_2O)_2$. Referring to FIGS. 6A and 6B, diagrams depict the molecular structure of $[VO_2(H_2O)_3]^+$ and of $VO_2Cl(H_2O)_2$, respectively. In this structure, one $Cl^-$ anion, two $O^{2-}$ anions, and two $H_2O$ molecules complex with one $V^{5+}$ in the first coordination shell. Without $Cl^-$ anions in the solution, two $O^{2-}$ anions, and three $H_2O$ molecules complex with $V^{5+}$ in the first coordination shell and a positively-charged specie with $[VO_2(H_2O)_3]+$ formula forms. Quantum chemistry calculations also indicate that, at elevated temperatures, this positively charged species is prone to convert to $V_2O_5 \cdot 3H_2O$ by de-protonation (Reaction 13) and condensation (Reaction 14). The structural differences appear to account for the much improved stability of $VO_2^+$ cations in $Cl^-$-containing solutions. Due to the formation of stable $VO_2Cl(H_2O)_2$ structure, the equilibrium concentration of $Cl_2$ gas in the catholyte solution should be lower than that shown in FIG. 5.

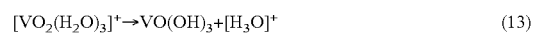

$$[VO_2(H_2O)_3]^+ \rightarrow VO(OH)_3 + [H_3O]^+ \quad (13)$$

$$2VO(OH)_3 \rightarrow V_2O_5 \cdot 3H_2O \downarrow \quad (14)$$

In embodiments comprising mixed $SO_4^{2-}Cl^-$ solutions, the stability of $V^{4+}$ is controlled by the solubility of $VOSO_4$, and the stability of $V^{3+}$ is controlled by the solubility of $VOCl$. The improvement of $V^{4+}$ stability is due to the decrease of $SO_4^{2-}$ concentration in the solution, and the improvement of $V^{3+}$ stability is due to the decrease of $Cl^-$ concentration. $V^{2+}$ cation is stable in both $Cl^-$ and $SO_4^{2-}$-containing solutions.

Figure 7:
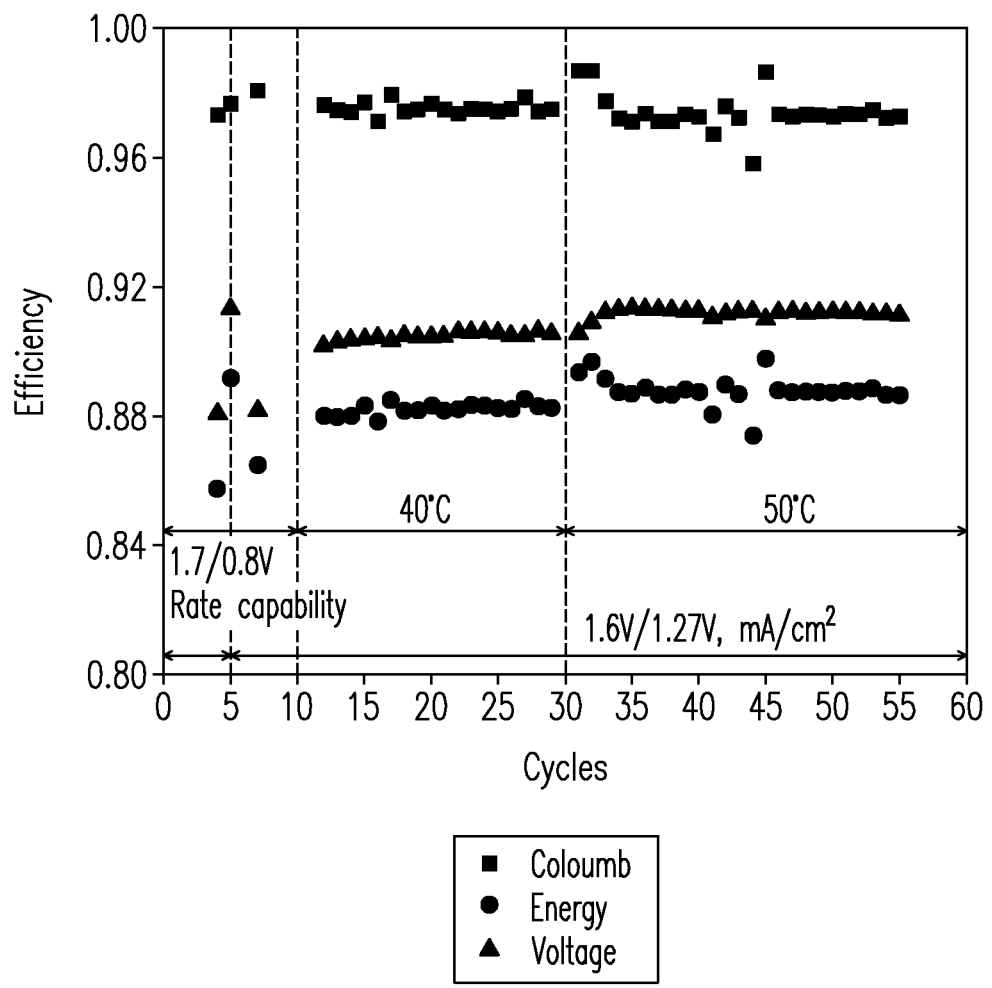
FIG. 7 is a graph of cyclic coulombic efficiency, voltage efficiency, and energy efficiency for a vanadium-chloride-sulfate RFB system.

In traditional all-vanadium sulfate RFBs, energy efficiency is about 80%, which means about 20% of the total energy is lost as waste heat during each cycle. For an adiabatic system, this heat can raise the temperature of the whole system by about 5° C. Due to the large amount of waste heat generation, stability of electrolytes at high temperature range is a major concern, especially during hot days. The embodiments of the present invention encompassing all-vanadium RFBs utilizing mixed $SO_4^{2-}$-$Cl^-$ supporting solutions system can not only improve the energy density, but can also expand the operation temperature window from 10-40° C. to −5-60° C. During the cold winter days, limited insulation can easily keep the temperature of the system above −5° C. Accordingly, in preferred embodiments, no active heat management is needed Several small VRFB cells were used to evaluate the performances of two vanadium sulfate-chloride mixed systems (with 2.5 M and 3.0 M vanadium). For comparison, the performance of a vanadium sulfate system (with 1.6 M vanadium) was also measured. The results are summarized in Table 6. The sulfate-chloride mixed systems show much higher energy density than the sulfate system. Even with higher vanadium concentration, the all vanadium sulfate-chloride mixed systems still showed similar energy efficiency to that of the vanadium sulfate system. FIG. 7 provides the cyclic coulombic efficiency, voltage efficiency, and energy efficiency of the 2.5 M all vanadium sulfate-chloride mixed acid system at different ambient temperatures. Stable performance was observed with this new system. During a course of 20 days of operation, the gas-phase pressures of the anolyte and catholyte containers remained constant, indicating no significant gas evolution occurred in the whole system. The viscosity and density of a solution containing 2.5 M $VOSO_4$ and 6 M HCl at 30° C. is 6.1 cP and 1.40 g/ml respectively, slightly lower than the 6.4 cP and 1.45 g/ml for a solution containing 2.0 M $VOSO_4$ and 3.0 M $H_2SO_4$.

TABLE 6

Performance of all vanadium redox flow cells using the mixed $SO_4^{2-}$-$Cl^-$ supporting solutions

| Current of Discharge, mA/cm² | Energy Density Wh/L | | | Coulombic Efficiency $\eta_C$ | | | Energy Efficiency $\eta_E$ | | | Voltage Efficiency $\eta_V$ | | |
|---|---|---|---|---|---|---|---|---|---|---|---|---|
| | 2.5VS 6Cl | 3VS 6Cl | 1.6V 4.5S | 2.5VS 6Cl | 3VS 6Cl | 1.6V 4.5S | 2.5VS 6Cl | 3VS 6Cl | 1.6V 4.5S | 2.5VS 6Cl | 3VS 6Cl | 1.6V 4.5S |
| 100 | 36.2 | 39.5 | 22.3 | 0.95 | 0.95 | 0.94 | 0.81 | 0.76 | 0.83 | 0.85 | 0.80 | 0.88 |
| 75 | 37.5 | 40.8 | 22.4 | 0.96 | 0.96 | 0.94 | 0.84 | 0.81 | 0.85 | 0.88 | 0.84 | 0.90 |
| 50 | 38.5 | 41.8 | 22.6 | 0.96 | 0.97 | 0.94 | 0.87 | 0.85 | 0.87 | 0.91 | 0.88 | 0.92 |
| 25 | 39.2 | 43.1 | 22.6 | 0.96 | 0.97 | 0.94 | 0.90 | 0.89 | 0.88 | 0.93 | 0.91 | 0.94 |

1. Cell operation conditions: 10 cm² flow cell, Charged to 1.7 V by 50 mA/cm² current.
2. 2.5VS 6HCl: 2.5M V 2.5M $SO_4^{2-}$ 6M $Cl^-$; 3VS6HCl: 3M V 3M $SO_4^{2-}$ 6M $Cl^-$; 1.6V 4.5S: 1.6M V 4.5M $SO_4^{2-}$.

The experiment details related to the all-vanadium RFBs using mixed $SO_4^{2-}$-$Cl^-$ supporting solutions are as follows. The flow cells consisted of two graphite electrodes, two gold-coated copper current collectors, two PTFE gaskets, and a Nafion® 117 membrane. The active area of the electrode and the membrane was about 10 cm². An Arbin battery tester was used to evaluate the performance of flow cells and to control the charging and discharging of the electrolytes. A Solartron 1287 potentiostat was employed for cyclic voltammetry (CV) experiments. The flow rate was fixed at 20 mL/min, which was controlled by a peristaltic pump. A balanced flow cell contained about 50 mL anolyte and 50 mL catholyte.

For cell performance evaluation and electrolyte solution preparation, the cell was normally charged at a current density of 50 mA/cm² to 1.7 V and discharged to 0.8 V with a current density of 25 to 100 mA/cm². Cell cycling tests were performed at 90% state-of-charge and state-of-discharge at a fixed charging and discharging current density of 50 mA/cm².

The electrolyte solutions of $V^{2+}$, $V^{3+}$, $V^{4+}$ and $V^{5+}$ used in this work were prepared electrochemically in flow cells using $VOSO_4$ (from Alfa Aesar) and $VCl_3$ as starting chemicals. $VCl_3$ solutions were prepared by dissolving $V_2O_3$ (from Alfa Aesar) in HCl solutions. The electrolyte stability tests were carried out in polypropylene tubes at −5° C., ambient temperature, 40° C., 50° C., and 60° C., using about 5 ml solution for each sample. During the stability tests, the samples were kept static without any agitation, and were monitored daily by naked eye for the formation of precipitation. Solution viscosity was measured using an Ubbelohde calibrated viscometer tube.

Thermodynamic calculations of reaction $2VO_2^+$ (a)$+4H^+$ (a)$+2Cl^-$ (a)$=2VO^{2+}$ were carried out using HSC Chemistry® 6.1 program from Outotec Research Oy. Quantum chemistry calculations were carried out using the Amsterdam Density Functional (ADF) program.

Yet another embodiment of the present invention encompasses a redox flow battery system based on the redox couple of Fe and V. In this system, the anolyte comprises $V^{2+}$ and $V^{3+}$ in the supporting solution while the catholyte comprises $Fe^{2+}$ and $Fe^{3+}$ in the supporting solution. The redox reactions and their standard potentials can be described as follows:

$$Fe^{2+}-e \rightleftarrows Fe^{3+} \quad E°=0.77V \text{ vs. NHE} \qquad (15)$$

$$V^{3+}+e \rightleftarrows V^{2+} \quad E°=-0.25V \text{ vs. NHE} \qquad (16)$$

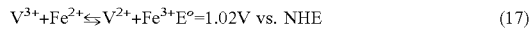

$$V^{3+}+Fe^{2+} \rightleftarrows V^{2+}+Fe^{3+} \quad E°=1.02V \text{ vs. NHE} \qquad (17)$$

The Fe/V system of the present invention can provide significant benefits while circumventing some of the intrinsic issues of conventional systems. For example, certain embodiments of the Fe/V system do not use catalysts and/or high-temperature management systems, which add to the complexity and cost of the system. Moreover the evolution of $H_2$ gas during charging is minimized since the working potential of $V^{2+}/V^{3+}$ (−0.25 V) is considerably higher than that of others, such as $Cr^{2+}/Cr^{3+}$ (−0.41 V). In the catholyte, the $Fe^{2+}/Fe^{3+}$ redox couple is electrochemically reversible and can be less oxidative than other common ionic species, such as $V^{4+}/V^{5+}$, which can result in higher stability at high temperatures while avoiding expensive, oxidation-resistant membrane materials, such as sulfonated tetrafluoroethylene based fluoropolymer-copolymer.

In one example using mixed Fe and V reactant solutions, an electrolyte for Fe/V redox flow battery tests was prepared by dissolving $VCl_3$ (99%) and $FeCl_2$ (98%) in concentrated HCl (38%). Cyclic voltammetry (CV) was carried out in Fe/V+HCl solutions with various concentrations to identify redox couples and electrochemical reversibility using a SOLARTRON 1287 potentiostat (SOLARTRON ANALYTICAL, USA). A Pt wire and Ag/AgCl electrode were used as the counter and reference electrodes, respectively. Glassy carbon electrodes and graphite felt (φ=5.5 mm) sealed onto a metal current collector were used as the working electrodes. The scan rate was 0.5 mV/s. Identical graphite felts without redox catalysts were used in both CV and flow cell testing.

Cell performance was measured under constant current methods using a flow cell system. The apparent area of graphite felt was 10 cm² (2 cm×5 cm), in contact with membrane. 1.25 M Fe/V in 2.3 M HCl solution and 1.17 M Fe/V in 2.15 M HCl solution were used with either a sulfonated tetrafluoroethylene based fluoropolymer-copolymer (i.e., NAFION) or a low-cost hydrocarbon membrane such as sulfonated poly(phenylsulfone) membrane (i.e., S-RADEL), respectively. Each electrolyte volume and flow rate was 50 mL and 20 mL/min. The flow cell was charged to 1.3 V and then discharged to 0.5 V at a current density of 50 mA/cm².

The chemical stability of commercially available membranes was determined by soaking them in 0.15 M $Fe^{3+}$ and 7 M total chloride solution at 40° C., and in 0.1 M $V^{5+}$ and 5 M total sulfate solution for comparison. During the stability tests, the samples were kept static without any agitation, and were monitored daily by naked eye for changes of color indicating oxidation of the membrane.

Figure 8A:
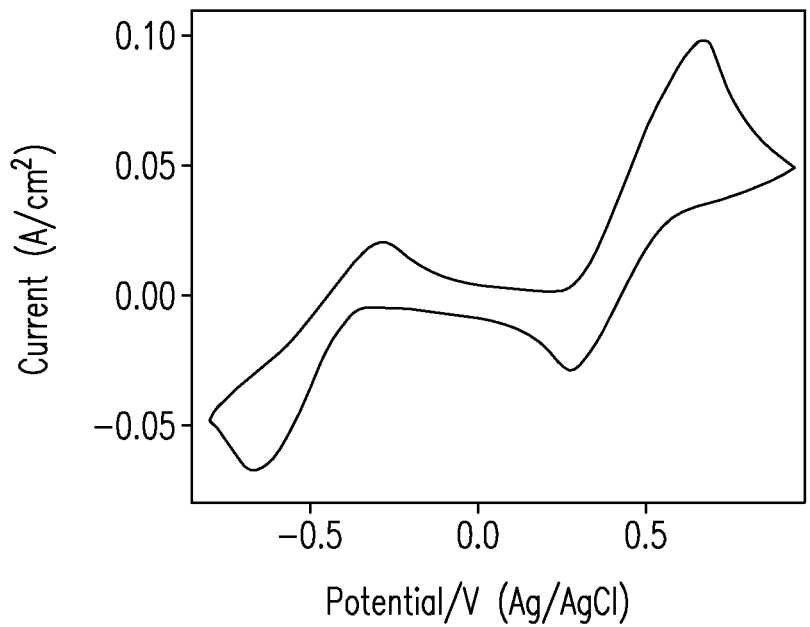
FIGS. 8A and 8B are cyclic voltammetry curves in a Fe/V and Cl-containing solution using two different electrodes.
Figure 8B:
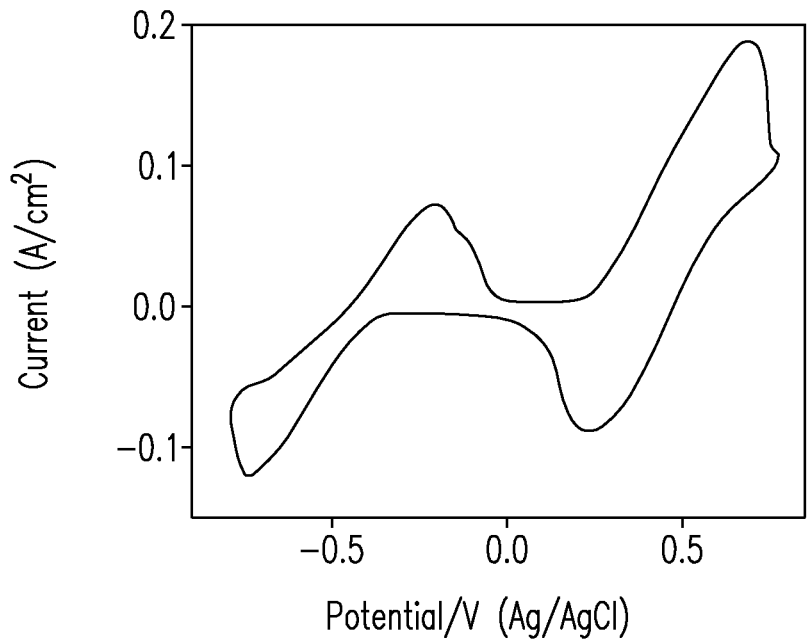

FIGS. 8A and 8B show CV results of 1.5 M Fe and V in a 1 M hydrochloric acid supporting solution using glassy carbon and graphite felt electrode, respectively. The current density is normalized to the geometrical area of the working electrode. Similar CV spectra were observed on both the glassy carbon and graphite felt working electrode with the graphite felt electrode demonstrating higher over potential due to the low conductivity. Two redox peaks were observed indicating two redox reactions, $Fe^{3+}/Fe^{2+}$ for the positive and $V^{2+}/V^{3+}$ for the negative. More importantly, no significant hydrogen evolution current was observed at potentials below the $V^{3+}$ reduction peak, indicating that no significant gas evolution occurred at the negative electrode during the charging process when employing a $V^{2+}/V^{3+}$ redox couple. Oxidation and reduction peaks appear in the forward and reverse scans on the positive side, which revealed a reversible redox couple of $Fe^{3+}/Fe^{2+}$ with a potential at approximately 0.5 V. Similarly, there is no anodic current observed associated with evolution of the $Cl_2$ and/or $O_2$ gas. Thus, the $Fe^{3+}/Fe^{2+}$ and $V^{3+}/V^{2+}$ redox couples in chloride supporting solution can be used in the negative and positive half cells according to embodiments of the present invention.

Figure 9A:
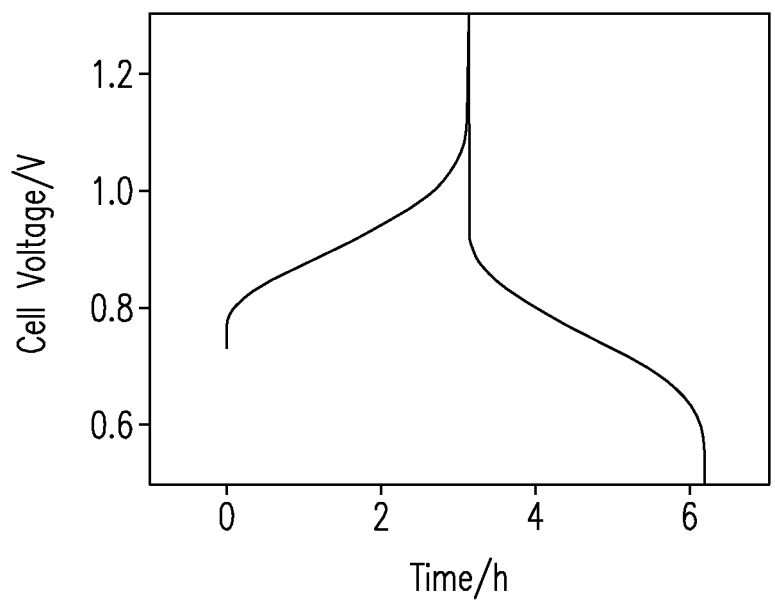
FIGS. 9A, 9B, 9C and 9D are graphs demonstrating the electrochemical performance of an Fe/V redox flow cell using a Cl-containing supporting solution.
Figure 9B:
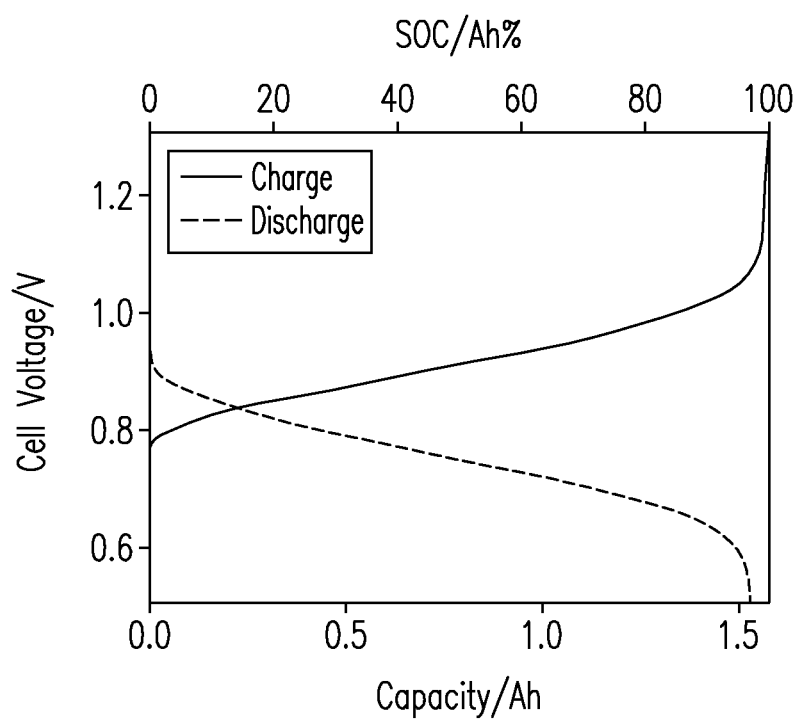
Figure 9C:
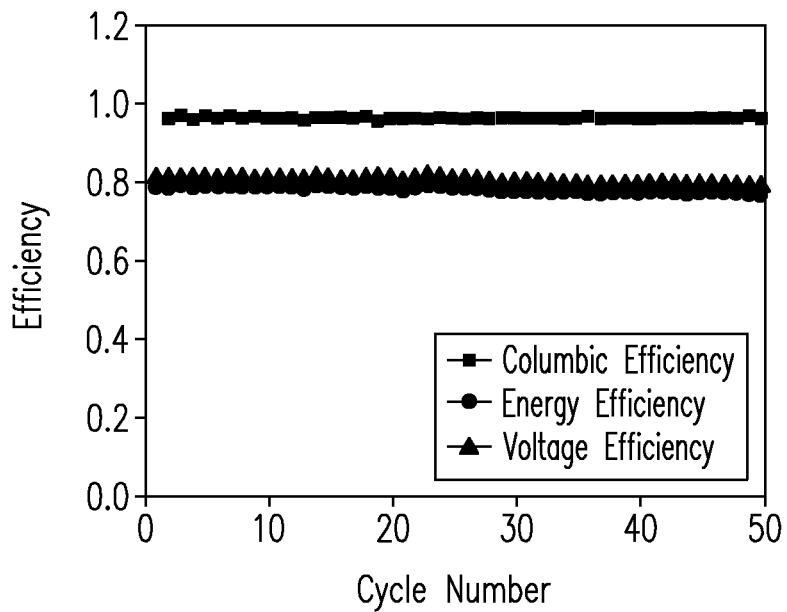
Figure 9D:
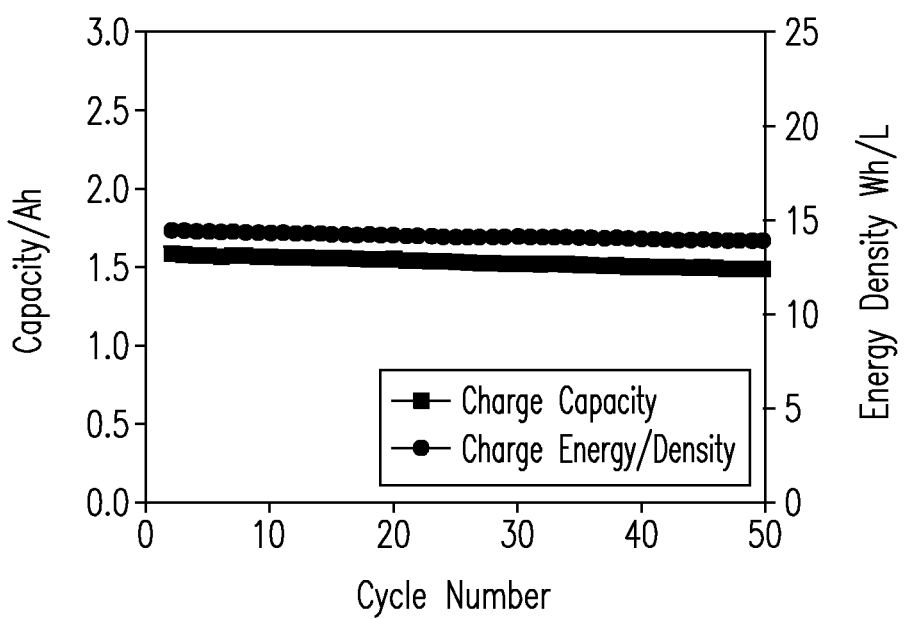

FIGS. 9A-9D show the results of Fe/V flow cell testing with a NAFION 117 membrane. A plot of cell voltage versus time is given in FIG. 9A. FIG. 9B demonstrates the cell voltage profile with respect to the cell capacity and the cell SOC. The SOC is calculated against the maximum charge capacity. Referring to FIG. 9B, the Fe/V redox flow cell can be charged and discharged to a SOC in the range of 0~100%. A utilization ratio of close to 100% can be achieved. Up to 50 cycles, the Fe/V cell demonstrated stable columbic efficiency of ~97%, energy efficiency of ~78%, and voltage efficiency of ~80% as shown in FIG. 9C. The Fe/V cell also demonstrated excellent capacity and energy density retention capability as shown in FIG. 3D with 0.1% loss per cycle in charge capacity over 50 cycles.

Commercially available, low-cost membranes, including a micro-porous separator, can be used in place of relatively expensive NAFION (i.e., sulfonated tetrafluoroethylene based fluoropolymer-copolymer) membranes. Suitable alternative membranes can include, but are not limited to, hydrocarbon-based commercially available ion-exchange membranes; for example, SELEMION® anion exchange membrane (APS, from Asahi Glass, Japan), SELEMION® cation exchange membrane (CMV, from Asahi Glass, Japan), and sulfonated poly(phenylsufone) membrane (S-RADEL® (RADEL® from Solvay Advanced Polymers, USA), and micro-porous separators typically used in lithium battery, for example; CELGARD® micro-porous separator (Celgard, USA).

Figure 10A:
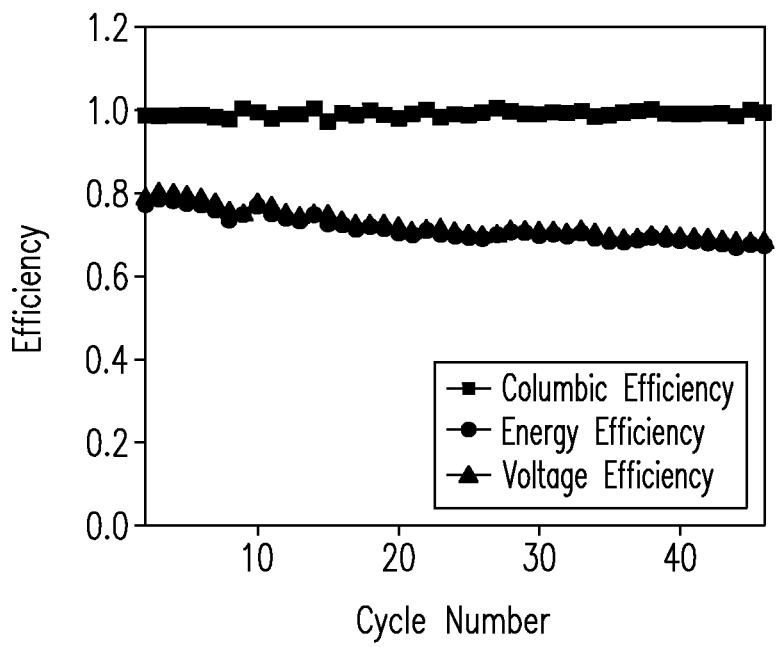
FIGS. 10A and 10B show cyclic Coulombic efficiency, voltage efficiency, and energy efficiency (a) as well as cell charge capacity and charge energy density change (b) for a Fe/V cell employing S-Radel as membrane
Figure 10B:
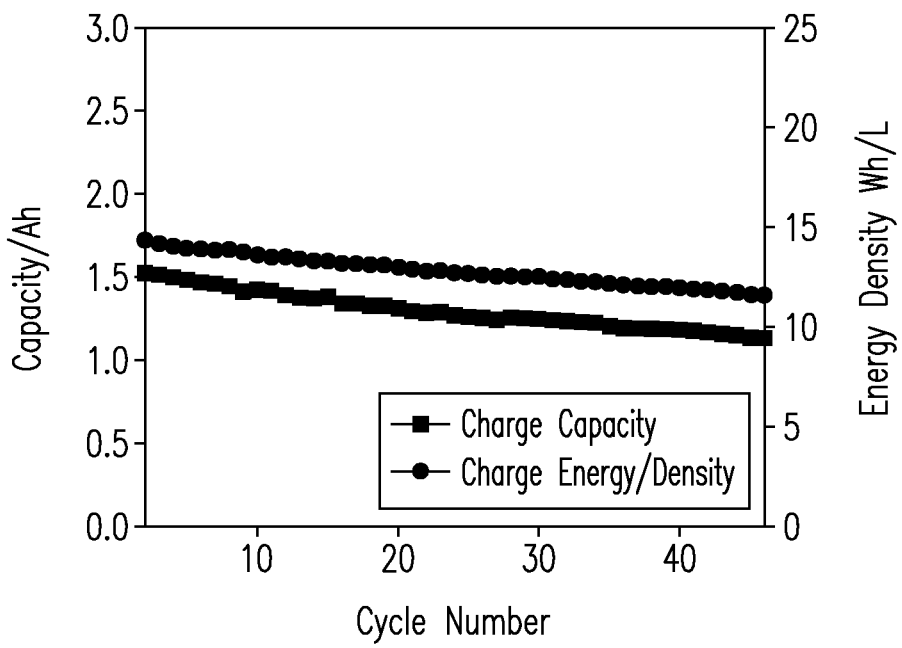

The electrochemical performance of a Fe/V cell employing a S-RADEL membrane was then evaluated using identical test protocols to that of Nafion membrane. The cell performance data is shown in FIGS. 10A and 10B. Similar Coulombic efficiency, voltage efficiency, and energy efficiency with that of Nafion membrane were obtained.

In a preferred embodiment, the energy density of Fe/V RFB systems can be improved by using a supporting solution comprising $SO_4^{2-}$–$Cl^-$ mixed ions to increase the reactant concentration in the anolyte and catholyte. Referring to Table 7, the solubility of $Fe^{2+}$ and $Fe^{3+}$ ions is higher in $H_2SO_4$—HCl mixed acids than in hydrochloric acid.

TABLE 1

Stability of $Fe^{n+}$ cations in the $H_2SO_4$—HCl mixed solutions

| $Fe^{n+}$ specie | $Fe^{n+}$, M | $H^+$, M | $SO_4^{2-}$, M | $Cl^-$, M | T. °C. | Time for precipitation |
|---|---|---|---|---|---|---|
| $Fe^{2+}$ | 2 | 4 | 2 | 4 | 25 | Stable (>6 d) |
| $Fe^{3+}$ | 2 | 6 | 2 | 6 | 25 | Stable (>6 d) |

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A battery system comprising:
   an all-vanadium redox flow battery system including
      an anolyte comprising electrochemically active ions consisting of $V^{2+}$ and $V^{3+}$;
      a catholyte comprising electrochemically active ions consisting of $V^{4+}$ and $V^{5+}$; and
      an aqueous HCl and $H_2SO_4$ supporting solution in the anolyte and the catholyte.

2. The system of claim 1, wherein the HCl and $H_2SO_4$ supporting solution has a sulfate ion to the chloride ion concentration ratio is between 1:100 and 100:1.

3. The system of claim 1, wherein the HCl and $H_2SO_4$ supporting solution has a sulfate ion to the chloride ion concentration ratio is between 1:10 and 10:1.

4. The system of claim 1, wherein the HCl and $H_2SO_4$ supporting solution has a sulfate ion to the chloride ion concentration ratio is between 1:3 and 3:1.

5. The system of claim 1, wherein the catholyte comprises $VO_2Cl(H_2O)_2$.

6. The system of claim 1 having a cell temperature greater than 40° C. during operation.

7. The system of claim 1 having a cell temperature between −35° C. and 60° C. during operation.

8. The system of claim 1 absent a thermal management device actively regulating the cell temperature.

9. The system of claim 1 wherein the supporting solution has a water content of greater than about 40 wt %.

10. The system of claim 1 wherein the supporting solution has a water content of greater than about 45 wt %.

11. The system of claim 1, wherein vanadium cation concentration is about 2.5M or greater.

12. The system of claim 1, wherein vanadium cation concentration is about 3.0 M or greater.

13. The system of claim 1 wherein the supporting solution has a water content of from about 45 wt % to about 60 wt %.

14. A battery system comprising:
   an anolyte and a catholyte having electrochemically active ions consisting essentially of vanadium ions;
   the anolyte having electrochemically active ions consisting of $V^{2+}$ and $V^{3+}$;
   the catholyte having electrochemically active ions consisting of $V^{4+}$ and $V^{5+}$; and
   an aqueous HCl supporting solution in the anolyte and in the catholyte.

* * * * *